United States Patent
Esterline et al.

(10) Patent No.: US 6,169,268 B1
(45) Date of Patent: Jan. 2, 2001

(54) METHOD AND APPARATUS FOR FORMING THE ENDS OF METALLIC TUBES

(75) Inventors: Dale F. Esterline; Michael J. Donovan, both of Springfield, OH (US)

(73) Assignee: Esterline & Sons, Inc., Springfield, OH (US)

( * ) Notice: Under 35 U.S.C. 154(b), the term of this patent shall be extended for 0 days.

(21) Appl. No.: 09/223,401

(22) Filed: Dec. 30, 1998

(51) Int. Cl.[7] .............................. B23K 9/12; B21D 5/00; B21D 39/04

(52) U.S. Cl. .......................... 219/125.11; 72/69; 228/173

(58) Field of Search ................. 219/125.11, 61, 219/60 A; 228/173, 15; 72/69, 82, 364

(56) References Cited

U.S. PATENT DOCUMENTS

| | | | |
|---|---|---|---|
| 2,406,059 | * | 1/1946 | Burch ................... 228/173.2 |
| 2,408,596 | | 10/1946 | Bednar ................... 29/148.2 |
| 2,699,596 | * | 1/1955 | Aronson ..................... 72/82 |
| 3,225,998 | | 12/1965 | Bowman ..................... 228/2 |
| 3,496,598 | | 2/1970 | Young et al. ................. 18/5 |
| 3,594,894 | * | 7/1971 | Mayer ..................... 228/173 |
| 3,653,240 | | 4/1972 | Huthsing, Jr. ................ 72/82 |
| 3,779,446 | * | 12/1973 | Lemelson ................. 228/15 |
| 3,964,412 | * | 6/1976 | Kidsuda ................... 72/364 |
| 4,061,009 | | 12/1977 | Kaporovich ................. 72/69 |
| 4,312,206 | | 1/1982 | Halene ........................ 72/69 |
| 4,942,280 | * | 7/1990 | Gaudin .................. 219/125.11 |
| 5,085,131 | | 2/1992 | Barrett et al. ............. 92/169.1 |
| 5,598,729 | | 2/1997 | Hoffmann et al. ............ 72/8.5 |
| 5,845,527 | * | 12/1998 | Hoffman et al. ............... 72/69 |

* cited by examiner

Primary Examiner—Patrick Ryan
Assistant Examiner—Anjan Dey
(74) Attorney, Agent, or Firm—Biebel & French

(57) ABSTRACT

A method and apparatus for forming constricted ends on tube products on an automatic continuous basis. The apparatus includes a feeding station including a spindle for supporting a metallic tube. A forming station is positioned downstream from the feeding station and includes a carriage supported for movement on a frame. A forming tool and a cutting tool are supported in spaced relation on the carriage. A welding unit, preferably a tungsten inert gas welder, is provided including a tip supported for movement with the carriage. The carriage is operably connected to a drive mechanism for driving the carriage in movement relative to the spindle. A controller is in communication with the drive mechanism for controlling movement of the carriage and is in further communication with the heat source for controlling activation thereof. A discharge conduit is supported on the carriage for discharging a plurality of successive formed tubes into a receiving bin.

22 Claims, 13 Drawing Sheets

METHOD AND APPARATUS FOR FORMING THE ENDS OF METALLIC TUBES

BACKGROUND OF THE INVENTION

1. Field of the Invention

The present invention relates to the processing of tube products and, more particularly, to a method and apparatus for constricting the ends of metallic tubes.

2. Description of the Prior Art

The prior art discloses various methods of forming constricted ends on metallic tubes. One such method is disclosed in U.S. Pat. No. 2,408,596 and involves rotating a tubular metal work piece while applying a forming tool to the end portion thereof to bring the end edges of the work piece forcibly into abutment. This method of forcing metal to flow in a particular direction by engaging a forming tool with a rotating work piece is often called "spinning."

One method of improving the flow of metal in the spinning process to assist in sealing the end of the tube comprises the step of heating the end of the metallic tube while the forming tool is in engagement therewith. This method, as disclosed in U.S. Pat. No. 5,085,131, is often referred to as "hot spinning." While it is preferred that heat is provided by an external source, it has been recognized that the heat generated by friction between the forming tool and the spinning tube may be sufficient to assist in sealing the newly formed constricted end of the tube.

Tubes having ends constricted by a spinning method may be used as a component in a wide variety of products. One such product of significant importance is thermistor protective housings. Such housings are typically manufactured from thin-walled stainless steel tubes. In such applications, it is critical for proper operation of the thermistors that the housings have uniform wall thickness throughout, particularly at the constricted ends. Furthermore, in conventional applications proper operation of the thermistors require that the ends of the housing be sealingly closed.

In order to ensure uniform wall thickness and consistently sealed ends of thermistor housings, the above described spinning operation must occur with high precision and consistent accuracy. The prior art methods of manually moving a forming tool into engagement with the end of a rotating tube is not only labor intensive and time consuming, but often results in thermistor housings having varying wall thicknesses and unsealed tips. While the prior art methods of "hot spinning," or heating the tube to assist in metal flow, have significantly improved the quality of closed end metallic tube products, these products still often have non-uniform wall thicknesses and unsealed ends.

Accordingly, there is a need for a method and apparatus for forming sealed constricted ends on metallic tubes wherein the thicknesses of the walls are consistently uniform. Furthermore, there is a need for such a method and apparatus having increased efficiency thereby reducing the cost of the finished product.

SUMMARY OF THE INVENTION

The present invention provides a method and apparatus for manufacturing consistently high quality constricted end tube products on an automatic continuous basis at high production speeds.

The apparatus of the present invention is adapted for manufacturing successive metallic tubes having sealed constricted ends and uniform wall thicknesses. The apparatus comprises a carriage supported for movement on a frame. A hollow spindle for supporting a piece of metallic tube stock is positioned upstream from the carriage and defines a longitudinal axis. A forming tool is supported for movement with the carriage and is engagable with a proximal end of the tube stock.

A welding unit including a welding tip supported for movement with the carriage, is provided for sealing the proximal end of the tube stock. The carriage is operably connected to a drive mechanism which drives the carriage in movement relative to the spindle. The drive mechanism is in communication with a controller which controls the movement of the carriage. The controller is in further communication with, and controls the activation of, the welding unit.

A cutting tool is supported in spaced relation to the forming tool for movement with the carriage into cutting engagement with the tube stock for defining a distal end of the finished tube. A discharge conduit is supported for movement with the carriage for receiving successive tubes after being severed by the cutting tool. A plurality of successive tubes are advanced through the discharge conduit and collected in a receiving bin position downstream therefrom. A feeding mechanism is positioned upstream from the spindle for feeding the tube stock downstream toward the carriage along the longitudinal axis.

The drive mechanism includes a first linear actuator for driving the carriage in parallel relation to the longitudinal axis and a second linear actuator for driving the carriage in perpendicular relation to the longitudinal axis. First and second insulating blocks electrically insulate the first and second linear actuators from the welding unit, which preferably comprises a tungsten inert gas welder. The controller provides signals to the drive mechanism instructing it to move the forming tool radially toward the longitudinal axis and axially downstream. The drive mechanism is further instructed by signals generated by the controller to move the welding tip into substantial alignment with the longitudinal axis proximate the proximal end of the tube. The controller also provides a signal to the welding unit for activating the welding tip, thereby sealing the end of the tube.

The method of the present invention comprises the steps of providing a piece of metallic tube stock having an open proximal end and defining a longitudinal axis. A carriage is provided downstream from the proximal end for supporting a forming tool and a welding tip. A drive mechanism is operably connected to the carriage and is in communication with a controller. The metallic tube stock is rotated along the longitudinal axis while the controller supplies a first drive signal to the drive mechanism. The drive mechanism operates in response to the first drive signal by moving the forming tool into engagement with the proximal end of the tube stock.

The controller subsequently generates a second drive signal for instructing the drive mechanism to move the welding tip into alignment with the longitudinal axis proximate the proximal end of the tube stock. The controller further generates a weld signal and the welding tip is activated in response to the weld signal thereby sealing the proximal end of the tube stock. The tube stock is then advanced downstream through the spindle, whereafter, the controller generates a cutting signal which instructs the drive mechanism to move the cutting tool into engagement with the tube stock at a location upstream a predetermined distance from the proximal end of the tube. The cutting tool cuts through the tube wall to form a distal end of the finished tube.

Therefore, it is an object of the present invention to provide a method and apparatus for constricting ends on metallic tubes on an automatic continuous basis with minimal human intervention.

It is another object of the present invention to provide a method and apparatus for forming tubular housings at high production speeds.

It is a further object of the present invention to provide such a method and apparatus for forming tubular housings having constricted ends with consistently uniform wall thicknesses.

It is an additional object of the present invention to provide such a method and apparatus for forming consistently sealed constricted ends on tubular housings.

It is still another object of the present invention to provide an apparatus of simple design for manufacturing tubular housings resulting in reduced initial startup and maintenance cost.

It is yet another object of the present invention to provide such an apparatus providing for single fixturing of the tube during multiple operations.

Other objects and advantages of the invention will be apparent from the following description, the accompanying drawings and the appended claims.

DETAILED DESCRIPTION OF THE PREFERRED EMBODIMENT

Figure 1:
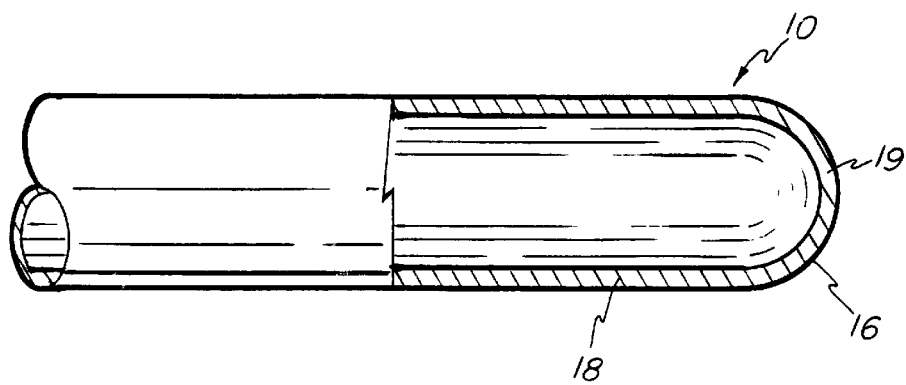
FIG. 1 is a side elevational view with a partial cut-away showing a constricted end of a tube formed by the method and apparatus of the present invention.
Figure 2:
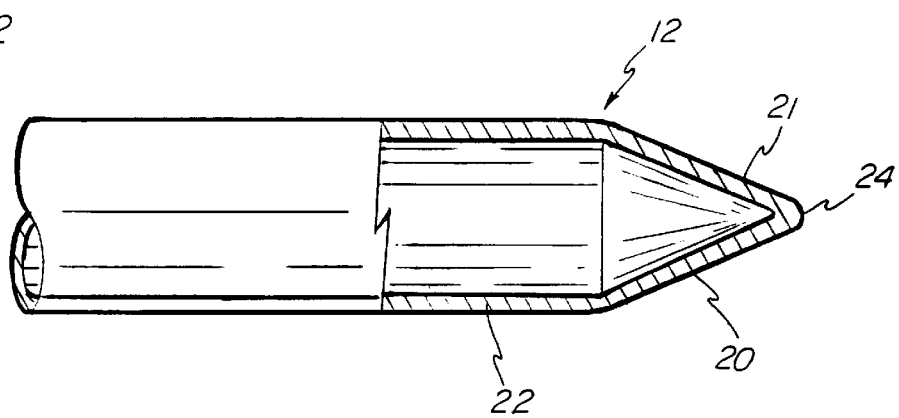
FIG. 2 is a side elevational view with a partial cut-away showing an alternative form of a constricted end of a tube formed by the method and apparatus of the present invention.
Figure 3:
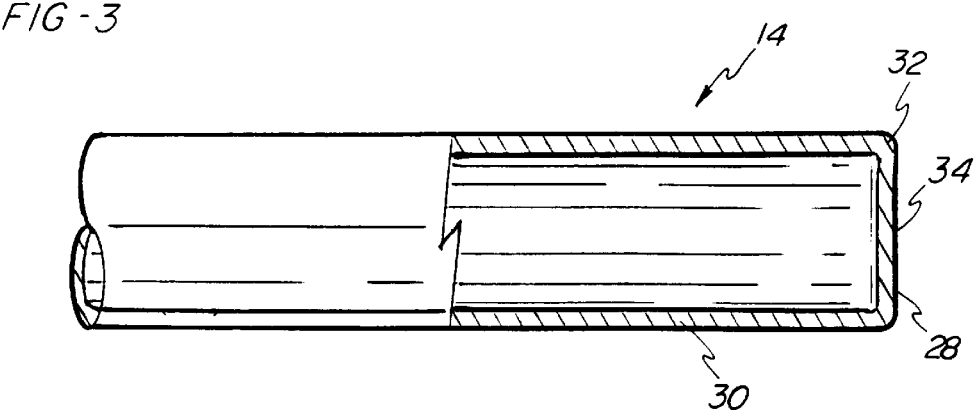
FIG. 3 is a side elevational view with a partial cut-away showing another form of a constricted end of a tube formed by the method and apparatus of the present invention.

The method and apparatus of the present invention is for use in the manufacture of tubes, or tubular housings, including closed tips, or sealed constricted ends, such as tubes 10, 12 and 14 shown in FIGS. 1–3. As illustrated in FIG. 1, a proximal end 16 of tube 10 is constricted to a bullet-nose shape comprising a wall 18 forming a surface 19 of a continuous uniform radius. The wall 18 of the tube 10 has a substantially uniform thickness and seals the constricted proximal end 16.

FIGS. 2 and 3 illustrate alternative forms of tubes 12 and 14 which may be formed by the method and apparatus of the present invention. Tube 12 has a proximal end 20 constricted to form a tapered surface 21. A wall 22 of substantially uniform thickness seals the constricted proximal end 20 at a point 24. FIG. 3 illustrates a tube 14 including a proximal end 28 having a wall 30 forming a sharp radius 32 and a substantially planar surface 34. Once again the wall 30 of the tube 14 has a substantially uniform thickness and seals the proximal end 28. It should be noted that FIGS. 1–3 illustrate only a few of the many different forms of tubes having constricted ends which may be manufactured using the method and apparatus of the present invention.

Figure 4:
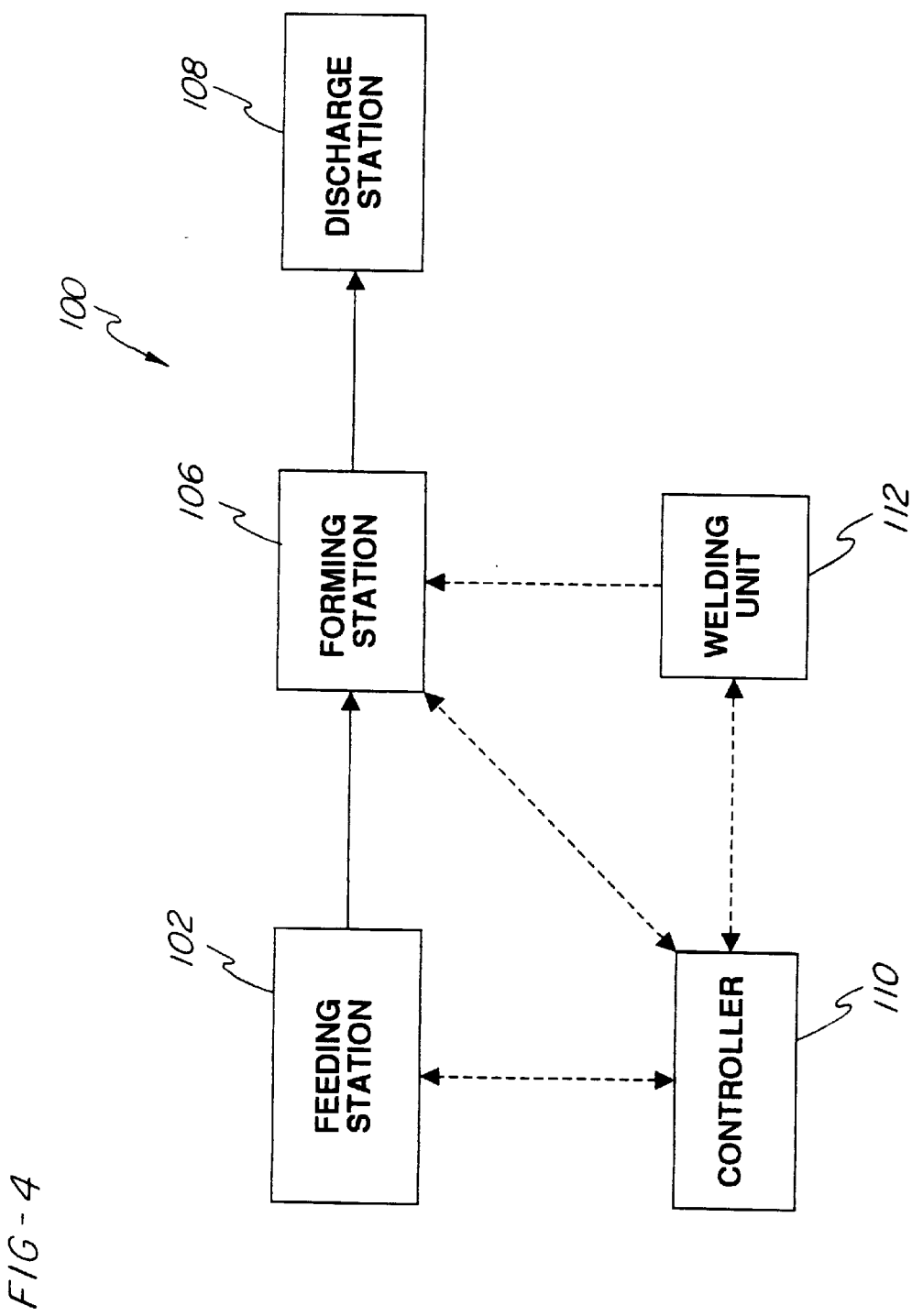
FIG. 4 is a block diagram of the apparatus by which the method of the present invention is performed.

FIG. 4 is a block diagram of the tube forming apparatus 100 of the present invention, illustrating three primary stations for forming a tube 10. While tube 10, including a continuous radius constricted end 16, will be utilized for illustrative purposes in the remainder of the description, this in no way limits the scope of the invention wherein any number of different constricted ends may be formed on tubes using the method and apparatus of the present invention. A feeding station 102 is provided with a plurality of pieces of thin-walled, open-ended tube stock 104 (FIG. 5), preferably made of stainless steel. It is preferred that the tube stock 104 have an outer diameter between 0.087 and 0.500 inches and a length sufficient to produce a number of finished tubes 10. The thickness of the wall 18 of each piece of tube stock 104 is preferably between 0.008 and 0.100 inches.

Figure 5:
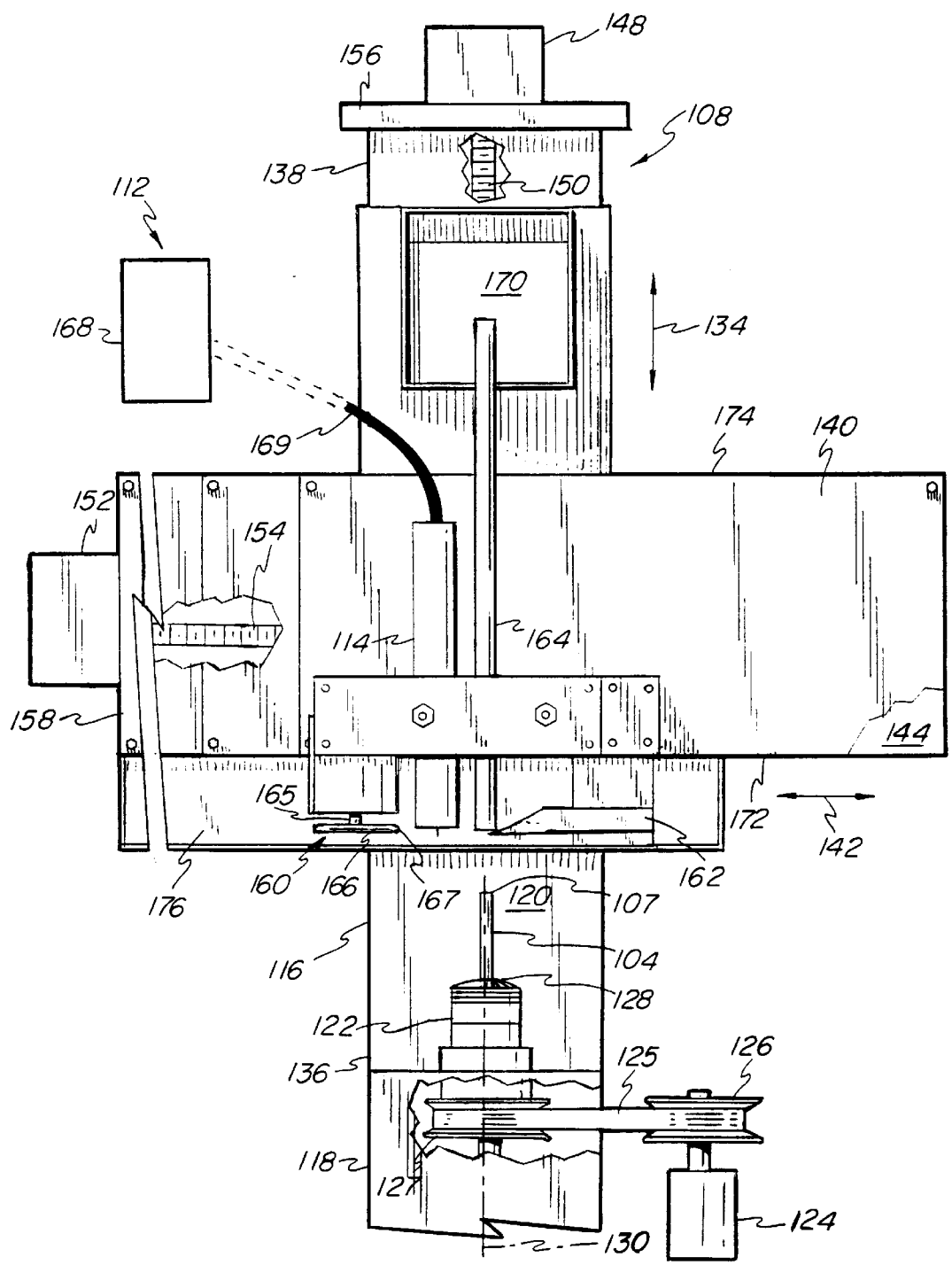
FIG. 5 is a top plan view of the forming station of the present invention.

Turning now to FIGS. 4 and 5, the feeding station 102 includes a feed device 103 (FIG. 7) which may comprise a conventional stock feeder of the type well known in the art, and preferably model AML62 manufactured by Lipe of Syracuse, N.Y. The individual pieces of tube stock 104 are fed from the feeding station 102 to a forming station 106. An open proximal end 107 (FIG. 5) of the tube stock 104 is formed and sealed within the forming station 106 and the tube stock 104 is then cut to a predetermined size. The newly formed tube 10 is then advanced to a discharge station 108.

Referring further to FIG. 4, a controller 110 is in communication with the feeding station 102 and forming station 106. A welding unit 112 is likewise in communication with the controller 110 and includes a welding tip 114 (FIG. 5) positioned within the forming station 106 for sealing the proximal end of the tube stock 104. While the controller 110 of the preferred embodiment comprises 9-Series Model 9/230 digital CNC processor available from Allen Bradley Inc. of Milwaukee, Wis., any similar device may be substituted therefor.

Figure 6:
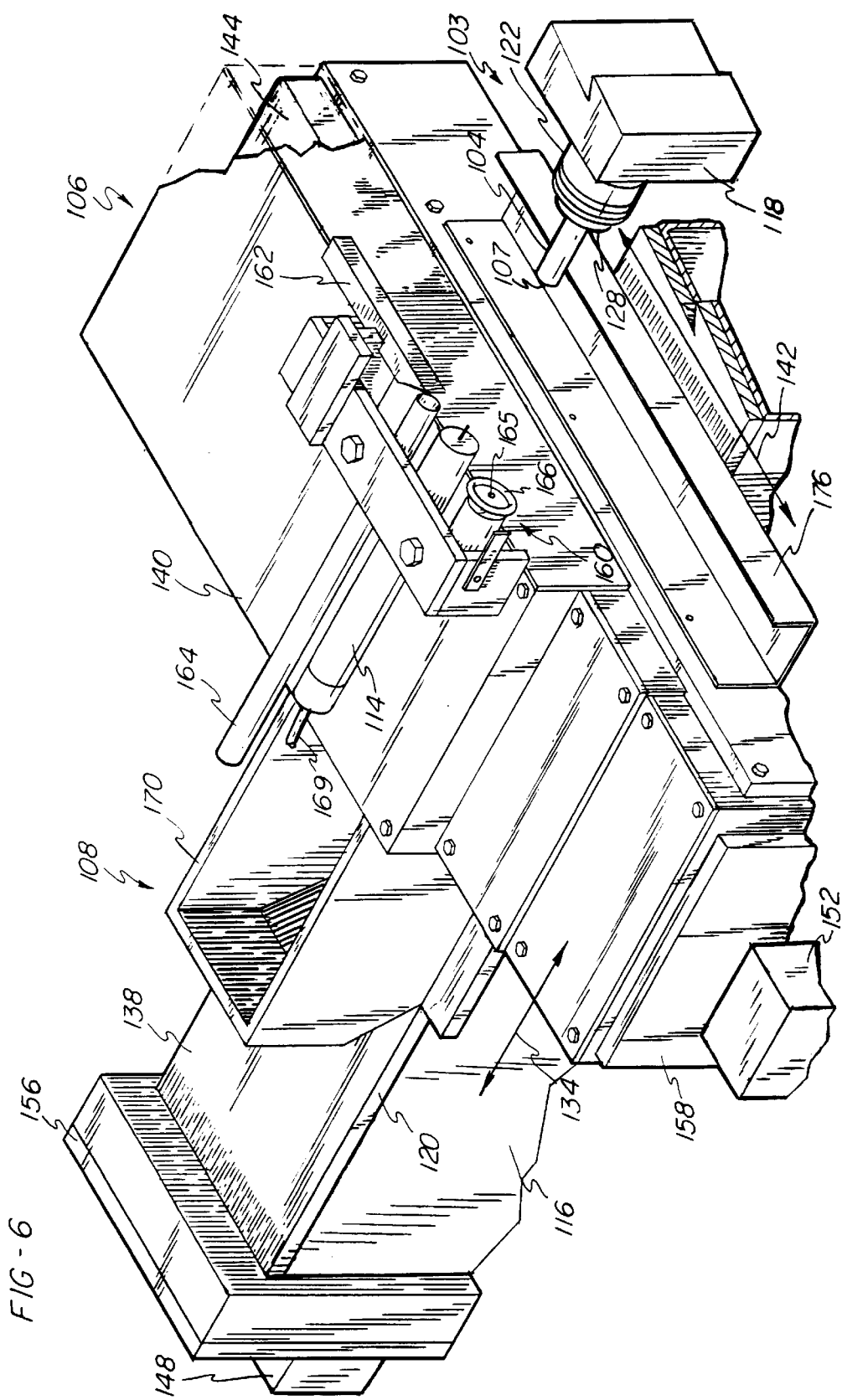
FIG. 6 is a perspective view of the forming station of the apparatus of the present invention.

FIGS. 5 and 6 illustrate the forming station 106 of the tube forming apparatus 100 of the present invention. The forming station 106 includes a frame 116 supporting a headstock 118 and a track 120. A spindle 122 is rotatably supported within the head stock 118 and is operably connected to a motor 124 through a power transmission belt 125 trained between a pair of pulleys 126, 127 in a manner as well known in the art. The tube stock 104 is concentrically received within a collet 128 which, in turn, is concentrically and threadably received within the spindle 122. As the collet 128 is continually threaded within the spindle 122, the collet 128 tightens to securely engage the tube stock 104 in a conventional manner. Once the collet 128 is tightened, operation of the motor 124 drives the tube stock 104 in rotation by transferring motion of pulley 126 through the belt 125, pulley 127, spindle 122 and collet 128. The collet 128 may be automatically tightened within the spindle 122 through a collet securing mechanism (not shown) of the type well known in the art.

The spindle 122 defines a longitudinal axis 130 along which the collet 128 and tube stock 104 are coaxially disposed. The frame 116, including the headstock 118 and the track 120, preferably comprises model HNC two axis turning center available from Hardinge Inc. of Elmira, N.Y. The feeding station 102 is positioned upstream from the head stock 118 and advances the tube stock 104 through the collet 128 after the collet 128 has been loosened to release the tube stock 104 in a manner well known in the art.

Referring further to FIGS. 5 and 6, a carriage 132 is supported for translational movement parallel to the longitudinal axis 130 in the direction of arrow 134 between upstream and downstream ends 136 and 138 of the track 120. The upstream end 136 of the track 120 is positioned proximate the headstock 118 and below the spindle 122. The carriage 132 supports a slide rest 140 which is supported for movement transverse, or perpendicular, to the longitudinal axis 130 in the direction of arrow 142 along a track 144. The carriage 132 is driven parallel to the longitudinal axis 130 by a first servo motor 148 supported on the frame 116. More particularly, the first servo motor 148 is operably connected to a first recirculating precision ball screw 150 (FIG. 5) which, in turn, is operably connected to the carriage 132. The first ball screw 150 extends parallel to the longitudinal axis 130 such that operation of the first servo motor 148 rotates the first ball screw 150 and drives the carriage 132 along the track 120 parallel to the axis 130.

The slide rest 140 is driven perpendicular to the longitudinal axis 130 by a second servo motor 152 supported on the carriage 132. A second recirculating precision ball screw 154 (FIG. 5) extends perpendicular to the axis 130, and is operably connected to the second servo motor 152 and the slide rest 140. As may be readily appreciated, operation of the second servo motor 152, rotates the second ball screw 154 thereby driving the slide rest in transverse movement relative to the carriage 132. Both first and second servo motors 148 and 152 preferably comprise digital positioning servo motors model 8520 available from Allen Bradley Inc. of Milwaukee, Wis.

Through extensive experimentation, it has been discovered that the welding unit 112 may interfere with the proper operation of the servo motors 148 and 152 when in electrical communication therewith. As such, both the first and second servo motors 148 and 152 are electrically insulated from the frame 116 of the apparatus 100 by first and second insulating blocks 156 and 158, respectively. It is preferred that the insulating blocks 156 and 158 comprise cloth based phenolic, although similar insulating materials may be substituted therefor.

The slide rest 140 supports a plurality of tools for operating upon the tube stock 104. More particularly, a forming tool 160 is mounted to the slide rest 140 in spaced relation to the welding tip 114, a cutting tool 162 and a discharge conduit 164. The forming tool 160 includes an axle 165 rotatably supporting a roller 166. The roller 166 is preferably comprised of a hardened steel and has a polished outer surface 167 for contacting the tube stock 104.

As noted above, the welding tip 114 forms part of the welding unit 112. A base unit 168 is connected to the tip 114 through a cable 169 wherein the tip 114 supplies an arc for sealing the proximal end 107 of the tube stock 104. The welding unit 112 is preferably a tungsten inert gas welding unit which is in communication with the controller 110. The tungsten inert gas welding unit may comprise TIG welding system model AWS-150 available from Weldlogic Inc. of Chatsworth, Calif.

The discharge conduit 164 is provided on the slide rest 140 for receiving successive newly formed tubes 10 and providing a passage for conveying these tubes 10 into a receiving bin 170. The discharge conduit 164 extends parallel to the longitudinal axis 130 beyond opposing ends 172 and 174 of the slide rest 140. The receiving bin 170 is supported on the carriage 118 below the discharge conduit 164. A shavings collection tray 176 is supported below the slide rest 140 for collecting metal shavings resulting from the processing of the finished tubes 10.

With reference now to FIGS. 7–15, the operation of the tube forming apparatus 100 of the present invention will be described in greater detail. As a convenient starting point for the description of the operation, it will be assumed that the tube stock 104 has been properly advanced from the feeding station 102 through the spindle 122 such that an appropriate predetermined amount of tube stock 104 is extending in the downstream direction from the collet 128. In such a position, the servo motors 148 and 150 are in a deactivated state such that the carriage 132 is at rest downstream in spaced relation with the proximal end 107 of the tube stock 104.

Figure 7:
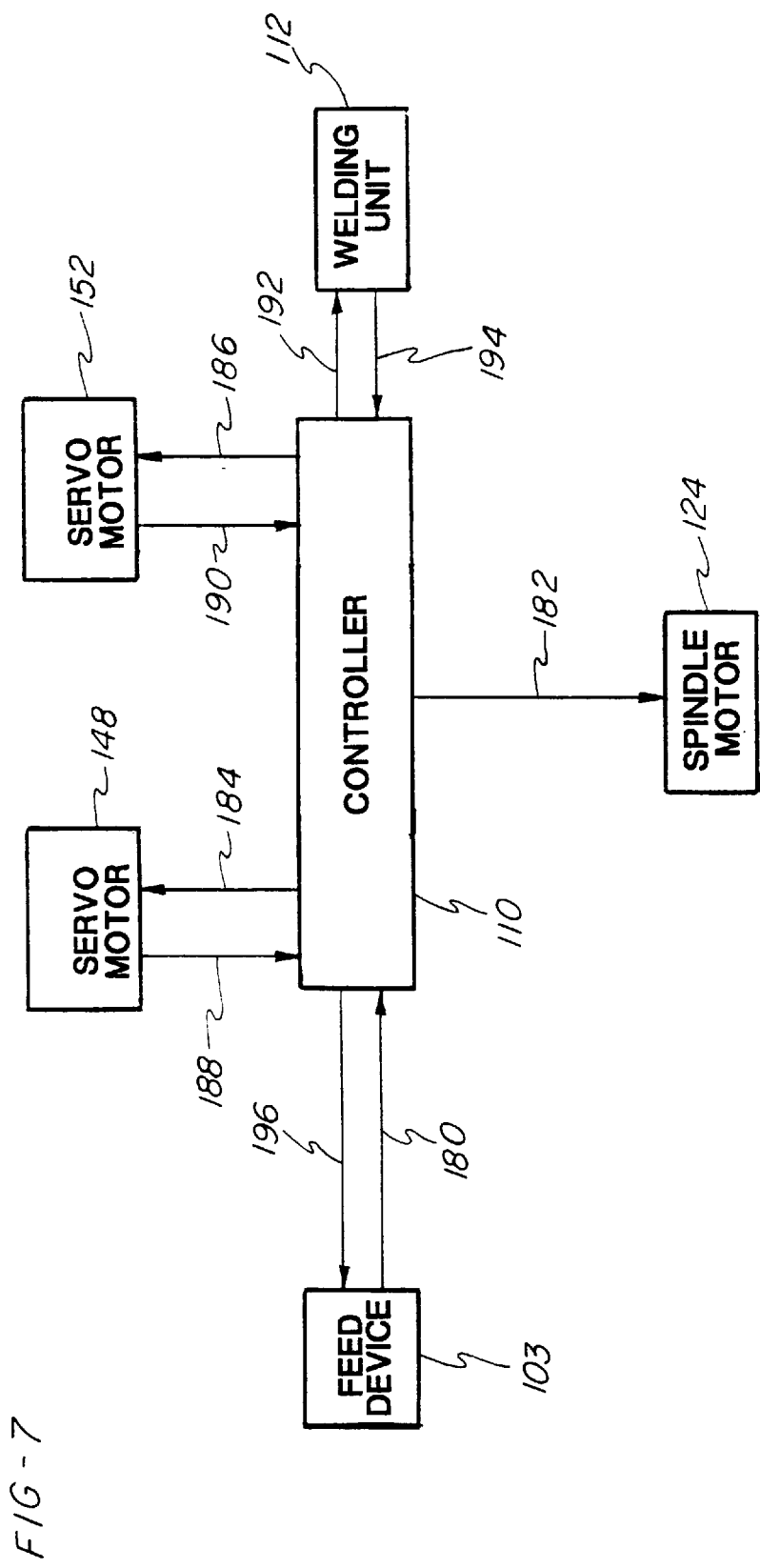
FIG. 7 is a block diagram illustrating the control system of the present invention.
Figure 8:
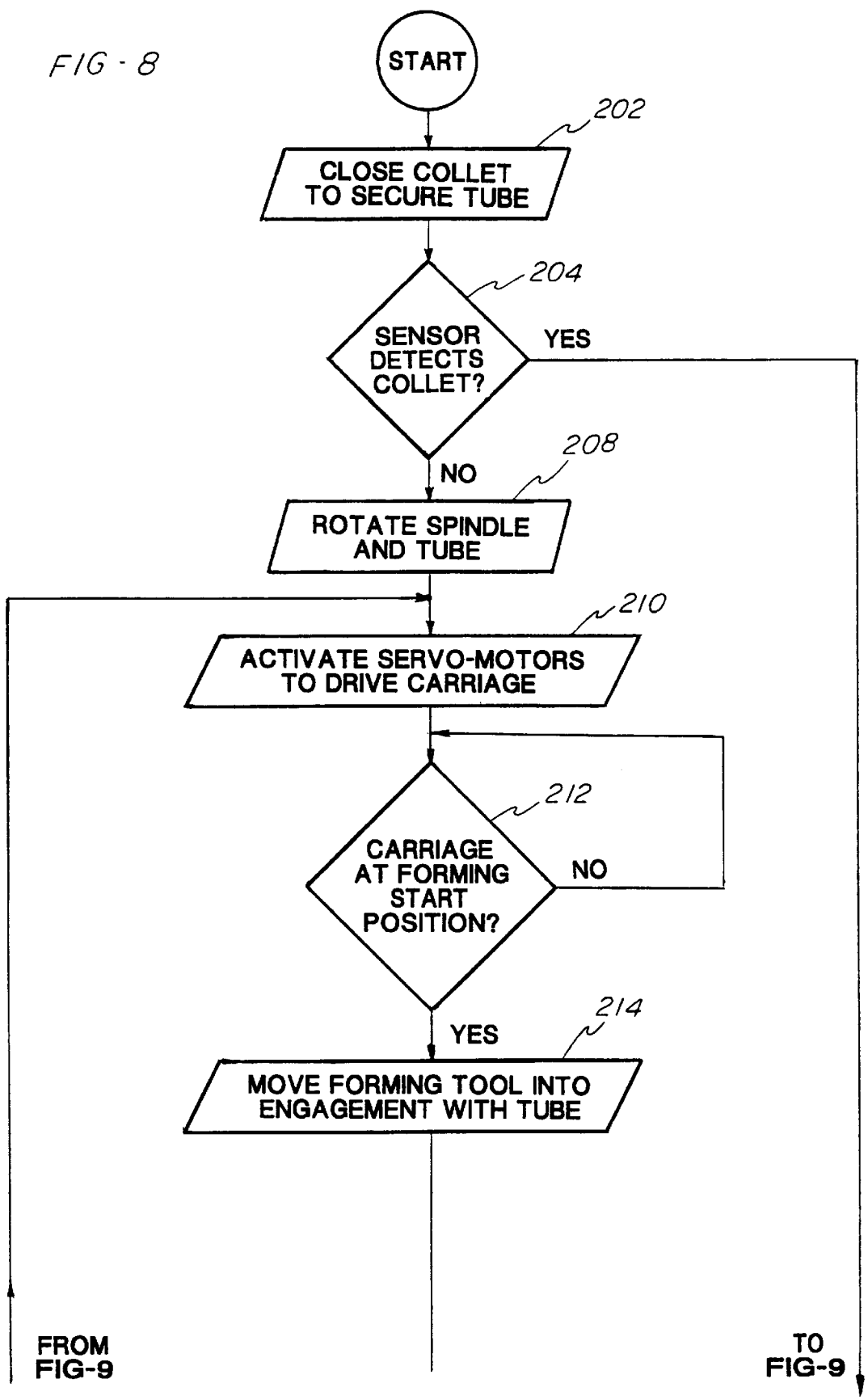
FIGS. 8–12 are flow charts representing the programming logic of the controller of the present invention.
Figure 15:
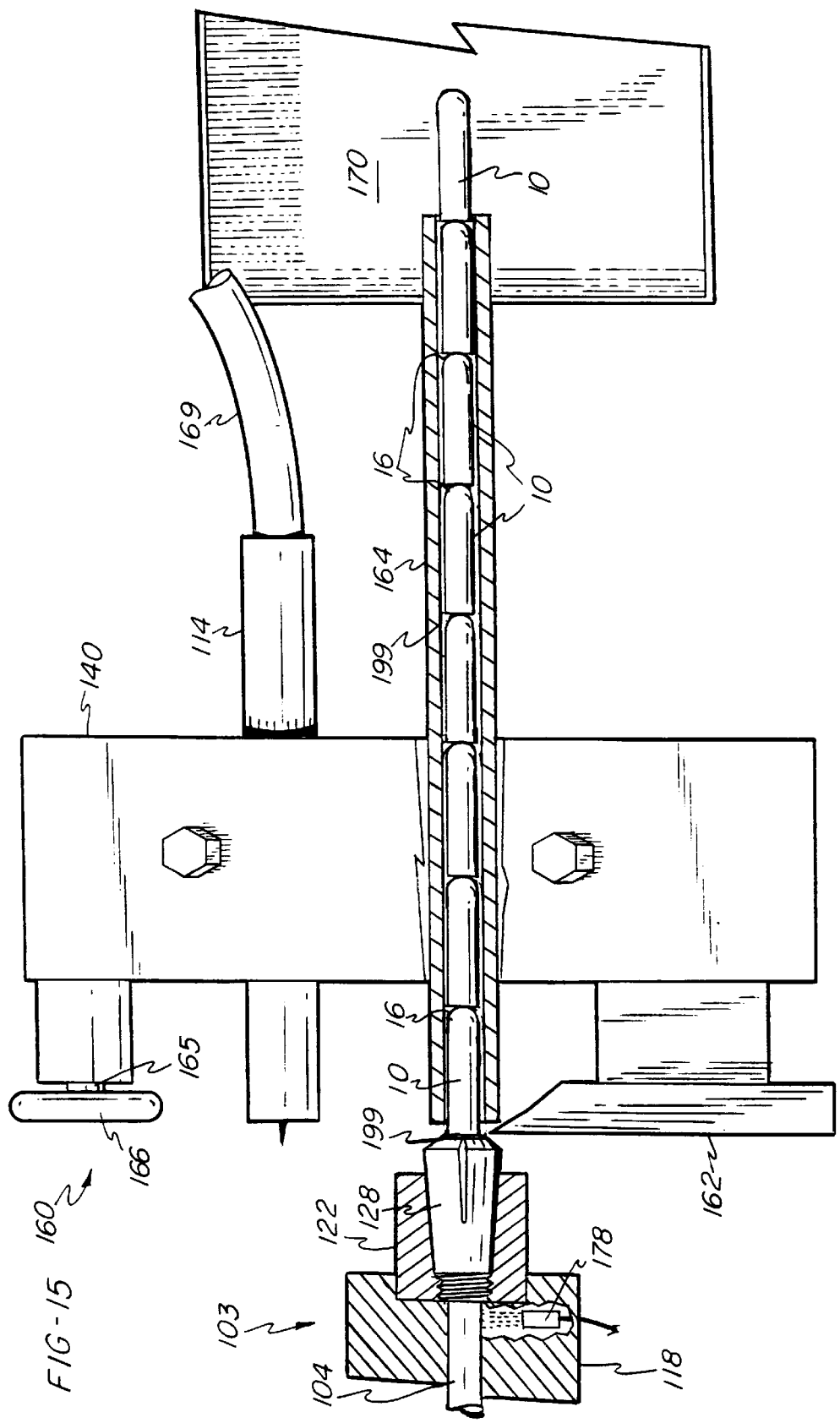
FIG. 15 is a top plan view of the slide rest and tube during the cutting step of the method of the present invention.

With further reference to FIG. 8, at block 202 the controller instructs the headstock 118 to close the collet 128 in order to secure the tube stock 104 within the spindle 122. As illustrated in FIG. 15, a collet sensor 178 actively monitors the location adjacent to and immediately upstream from the collet 128 as indicated by block 204 of FIG. 8. As the collet 128 is tightened about the tube stock 104, the collet 128 moves upstream relative to the spindle 122. If an insufficient length of tube stock 104 is received within the collet 128, then as the collet 128 is tightened it moves upstream to a position where it is detected by the sensor 178. Upon detecting the collet 128, the sensor 178 sends a supply signal 180 to the controller 110 (FIG. 7). The controller 110 may then exit the program at block 206 (FIG. 12) or, alternatively, prompt the operator for additional input by indicating an insufficient quantity of tube stock 104 received within the collet 128. At this point the operator would supply the feeding station 102 with additional tube stock 104 to continue operation.

At block 208, the controller 110 sends a rotate signal 182 to the motor 124 instructing the motor 124 to activate and thereby rotate the spindle 122 and tube stock 104 (FIG. 7). Next, at block 210, the controller sends first and second drive signals 184 and 186 to the first and second servo motors 148 and 152, respectively, instructing the motors 148 and 152 to drive the carriage 132 (FIG. 7). The carriage 132 is driven to a forming start position at coordinates preselected by the operator and programmed into the controller 110.

Referring now to block 212, the first and second servo motors 148 and 152 provide first and second position signals 188 and 190 to the controller 110 indicating the location of the carriage 132 (FIG. 7). When the position signals 184 and 186 indicate that the carriage 132 is at the forming start position, the controller 110 again sends first and second drive signals 184 and 186 to the first and second servo motors 148 and 152. The first and second drive signals 184 and 186 instruct the servo motors 148 and 152 to move the forming tool 160 into engagement with the tube stock 104, as indicated by block 214.

Figure 13:
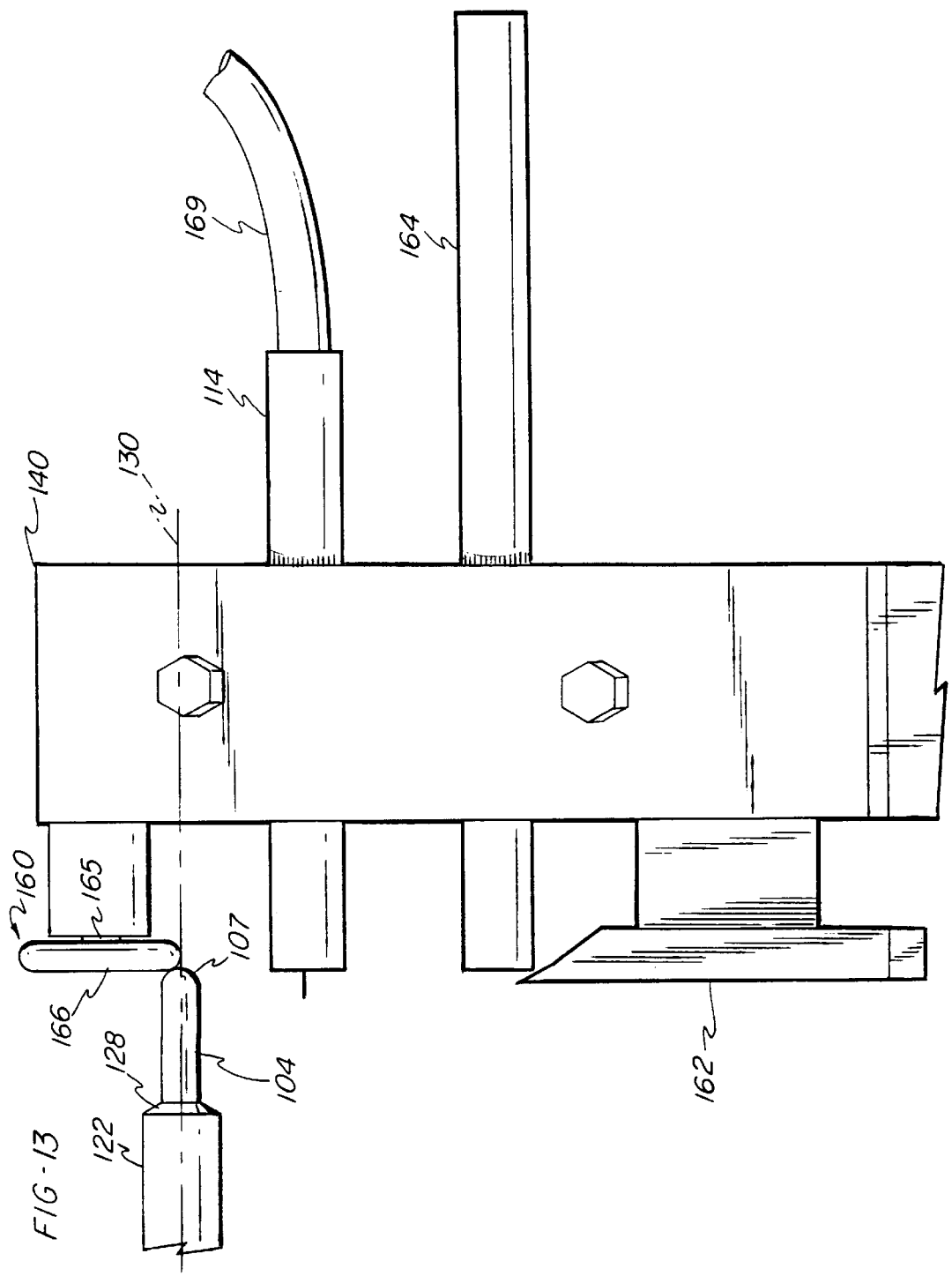
FIG. 13 is a top plan view of the slide rest and tube during the spinning step of the method of the present invention.

Referring now to FIG. 13, the forming tool 160 is moved along a predetermined path preselected by the operator as programmed into the controller 110. More particularly, the program instructs the servo motors 148 and 152 to drive the carriage 132 such that the forming tool 160 moves longitudinally downstream and transversely towards the longitudinal axis 130 such that the metal at the proximal end 107 of the tube stock 104 is spun towards the longitudinal axis thereby forming a constricted end. Depending upon the particular path selected, the constricted proximal end 107 of the tube stock 104 may take any one of a wide variety of shapes including the bullet nose, flat head, and tapered point as illustrated in FIGS. 1–3.

Figure 9:
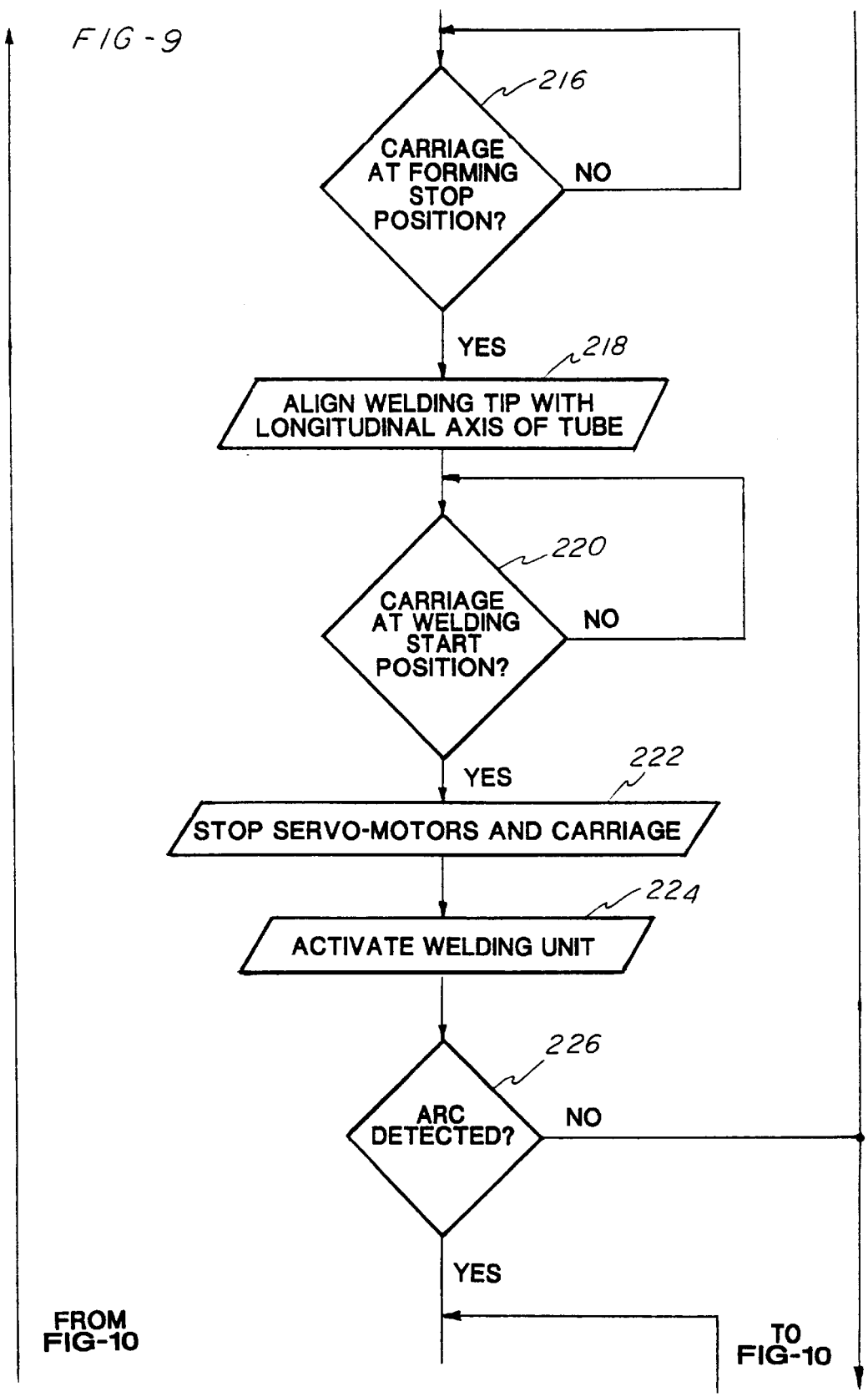
Figure 14:
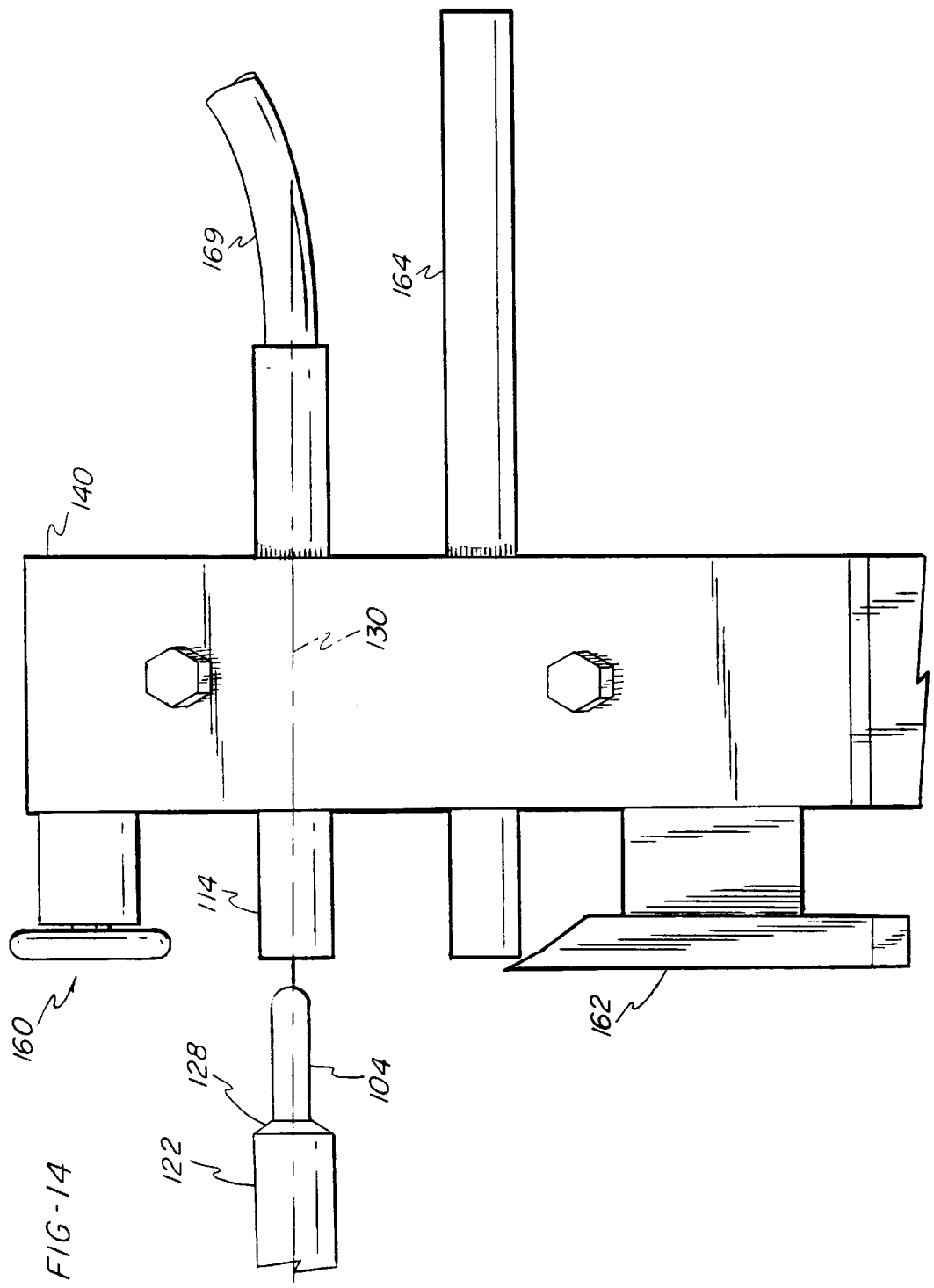
FIG. 14 is a top plan view of the slide rest and tube during the welding step of the method of the present invention.

Referring now to block 216 of FIG. 9, once the servo motors 148 and 152 provide position signals 188 and 190 indicating that the carriage 132 is at a forming stop position, which again is preselected by the operator, the controller 110 sends drive signals 184 and 186 to the servo motors 148 and 152 (FIG. 7). At block 218, these drive signals 184 and 186 instruct the servo motors 148 and 152 to move the carriage 132 such that the welding tip 114 is longitudinally aligned with the axis 130 of the tube stock 104 at a welding start position as illustrated in FIG. 14. The controller at decision block 220 compares the position signals 188 and 190 as received by the servo motors 148 and 152 to determine if the carriage 132 is at the welding start position, which has been preprogrammed into the controller 110 by the operator.

If the carriage 132 is at the welding start position, then at block 222 the controller 110 sends drive signals 184 and 186 to the servo motors 148 and 152 instructing them to stop the carriage 132. Next, at block 224, the controller 110 sends a weld signal 192 instructing the welding unit 112 to activate (FIG. 7), whereby the base unit 116 produces an arc at the tip 114 for sealing the constricted end 107 of the tube stock 104. Simultaneously, the controller 110 sends drive signals 184 and 186 to the servo motors 148 and 152 (FIG. 7) for driving the welding tip 114 longitudinally toward the tube stock 104 and laterally away from the longitudinal axis 130. The welding unit 112 and servo motors 148 and 152 are controlled by a subroutine programmed by the operator for providing energy of a certain intensity and duration depending upon the thickness of the tube wall 18 and geometry of the constricted end 107.

In the preferred embodiment, the welding unit 112 is programmed to supply an average heat, or energy density, of 43,750 watts per square inch through a current setting of approximately 17.5 amps. The servo motors 148 and 152 are controlled by the controller 110 to maintain a substantially constant weld gap of 0.035 inches between the welding tip 114 and the constricted end 107 of the tube stock 104 while the welding tip 114 is moved laterally away from the longitudinal axis 130. As may be appreciated, the servo motors 148 and 152 move the welding tip 114 in the lateral and longitudinal directions along a curve approximating the outer surface of the constricted end 107.

The feedrate at which the servo motors 148 and 152 move the welding tip 114 is defined by the equation $F=1/3300K$, where F is the feedrate in the unit of inches per revolution of the tube stock 104, and K is the thickness of the tube wall 18 in the unit of inches. The duration of the weld may then be calculated from the equation $T=R/15F$, where T is the duration of the weld in the unit of seconds, and R is the radius of the tube stock 104 in the unit of inches. By substituting 1/3300K for F in the equation $T=R/15F$, it may be seen that the weld duration T is equal to the equation $T=3300(K)(R)/15$.

It should be noted that during the welding operation, the spindle 122 continuously rotates the tube stock 104 at a substantially constant speed of 300 revolutions per minute (rpm). The rotation of the tube stock 104 in combination with the lateral and longitudinal movement of the welding tip 114 ensures substantially uniform heat transfer to the constricted end 107. Typically, the energy supplied to the tube stock 104 ranges from 135 to 250 watts supplied to a 0.002 to 0.003 square inch area on the constricted end 107 for a period from between 0.5 to 3.0 seconds.

At block 226, the controller 110 searches for an arc signal 194 sent by the welding unit 112 (FIG. 7). The arc signal 194 indicates whether a proper arc is generated by the tip 114 of the welding unit 112 for sealing the end of the tube stock 104. If the proper arc signal 194 is not detected by the controller 110 then the controller 110 exits the program at block 206. Alternatively, the controller 110 may provide an indication to the operator that a proper arc has not been detected and instructing the operator to take corrective measures.

Figure 10:
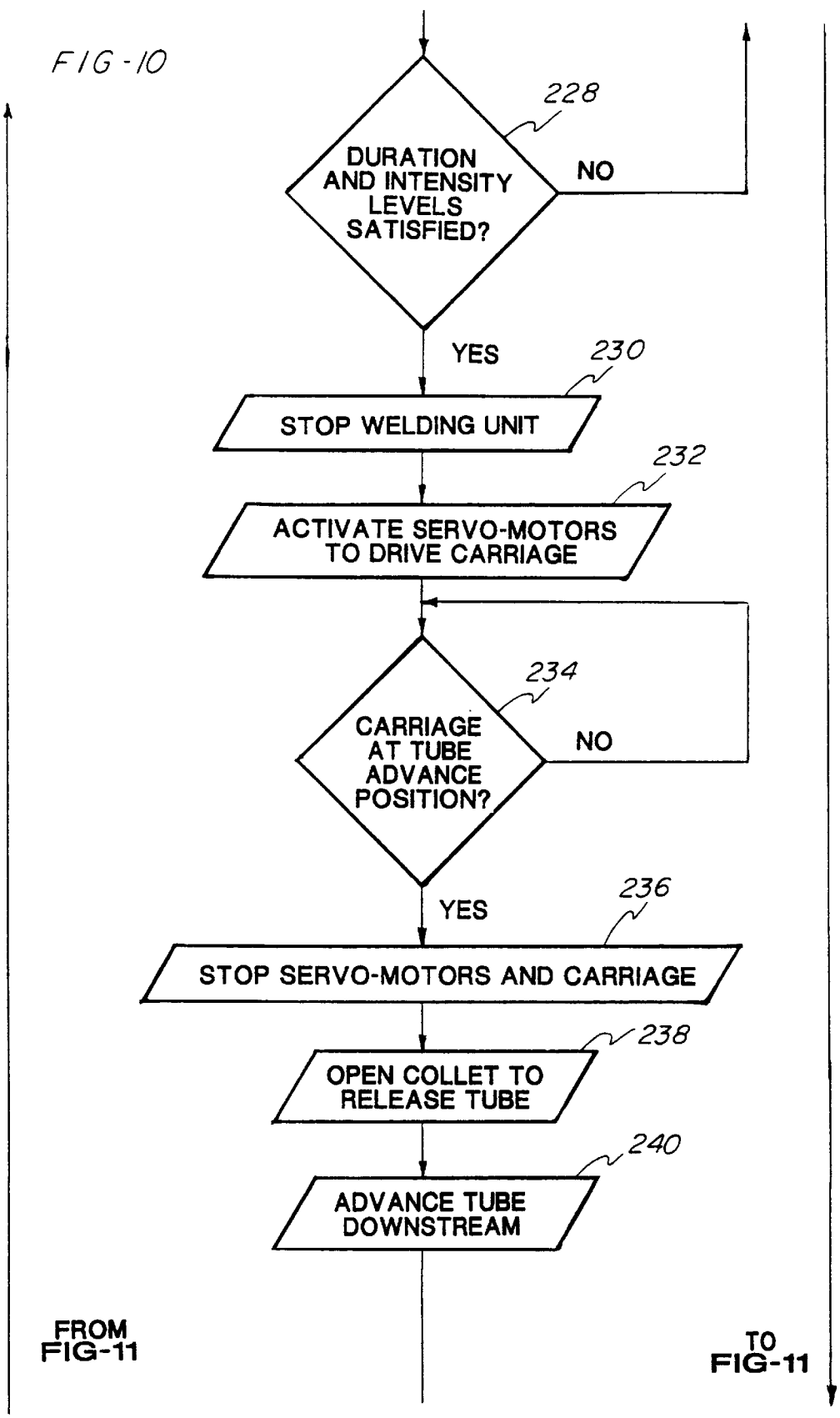

Referring now to block 228 of FIG. 10, the arc signal 194 may also provide an indication of duration and intensity levels of the arc provided to the proximal end 107 of the tube stock 104. Once the duration and intensity levels have been satisfied, the controller moves to block 230, where the controller 110 sends a weld signal 192 to the welding unit 112 instructing it to stop (FIG. 7). At block 232, the controller 110 instructs the servo motors 148 and 152, through drive signals 184 and 186 to drive the carriage 132 along a predetermined path as preprogrammed within the controller 110 by the operator. When the carriage 132 reaches a tube advance position, as indicated by decision block 234, the controller 110 provides drive signals 184 and 186 to the servo motors 148 and 152 instructing them to stop, as indicated by block 236. Further, the controller 110 sends a rotate signal 182 to the headstock 118 instructing the spindle motor 124 to stop rotating the tube stock 104.

Figure 11:
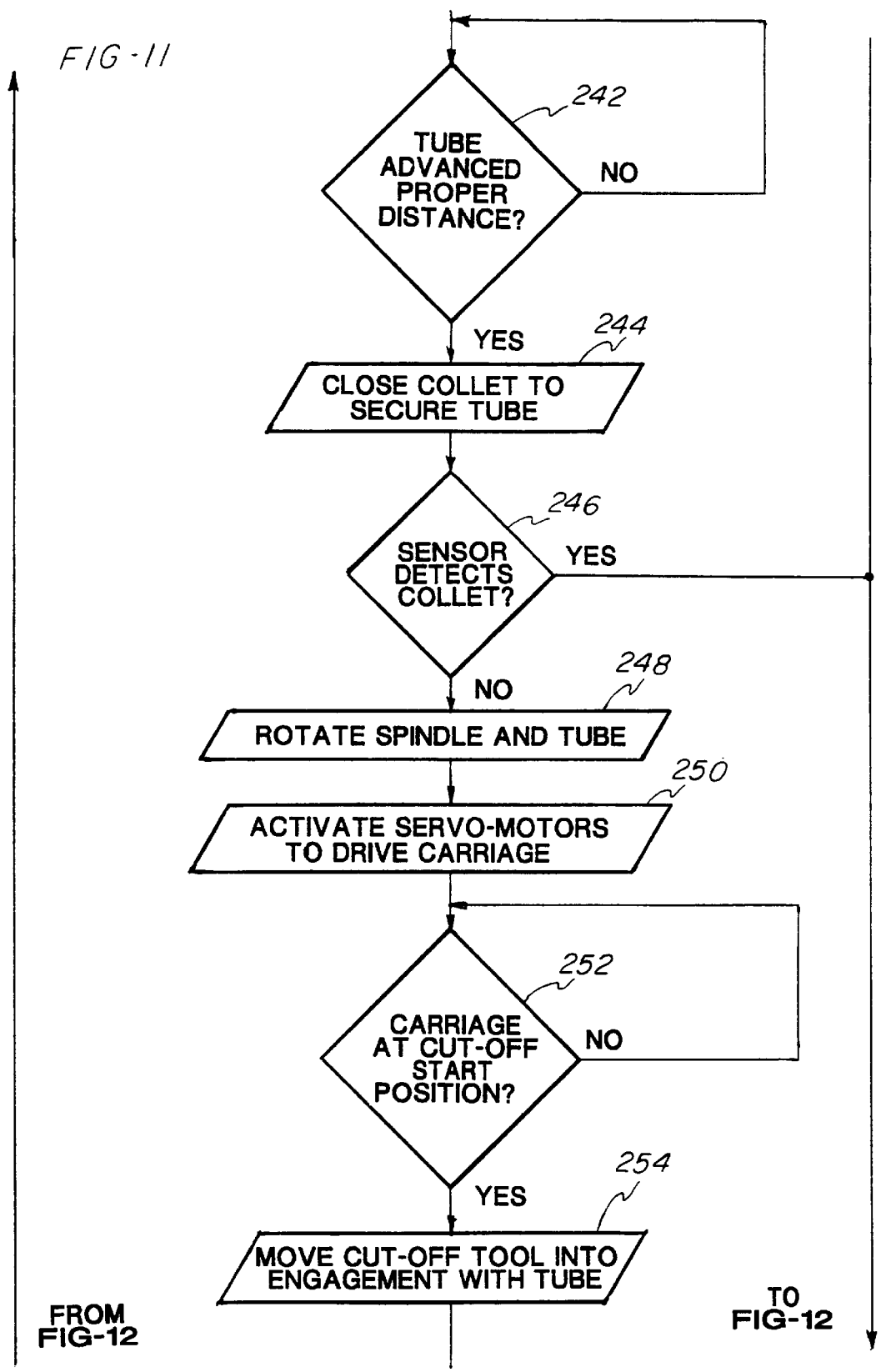

With reference now to FIGS. 11 and 15, at the tube advance position, the tube stock 104 is positioned in substantial alignment with the discharge conduit 164. At block 238, the controller 110 sends a feed signal 196 to the feeding station 102 instructing the headstock 118 to open the collet 128 thereby releasing the tube stock 104 (FIG. 7). At block 240, the controller 110 advances the tube stock 104 downstream a predetermined distance which is equal to the desired length of the finished tube 10 plus any tube length consumed in spinning and cutting the end of the tube stock 104.

As illustrated in FIG. 15, as the tube stock 104 is advanced downstream, the proximal end 107 pushes the plurality of earlier formed tubes 10 downstream through the discharge conduit 164. As may be appreciated, each successive tube 10 engages a preceding tube 10 such that subsequent downstream advancement of the tubes 10 results in the tube 10 at the downstream end of the conduit 164 being discharged into the receiving bin 170.

At block 242 of FIG. 11, the controller 110 looks for a supply signal 180 from the feeding station 102 indicating that the tube stock 104 has been advanced a proper distance. When the tube stock 104 has been advanced a proper distance, the controller 110 next instructs the headstock 118 to close the collet 128 to secure the tube stock 104 within the spindle 122, as indicated at block 244. If the collet sensor 178 detects the collet 128 at block 246, then the supply signal 180 sent to the controller 110 indicates such. As described above, if the collet 128 is detected, then this is an indication that an insufficient length of tube stock 104 is provided and the controller 110 exits the program at block 206. Alternatively, the controller 110 may alert the operator of the insufficient supply of tube stock 104.

Referring now to block 248, once the controller 110 determines that a sufficient supply of tube stock 104 is provided within the spindle 122, the controller 110 sends a rotate signal 182 to the headstock 118 instructing the spindle motor 124 to rotate the tube stock 104. At block 250, drive signals 184 and 186 are sent to the servo motors 148 and 152 which are then instructed to drive the carriage 132 to a cutoff start position. Once again, the path taken by the carriage and location of the cutoff start position is pre-programmed within the controller 110 by the operator. At block 252, once the controller receives the position signals 188 and 190 from the servo motors 148 and 152 indicating that the carriage 132 is located at the cut-off start position, the controller 110 sends further drive signals 184 and 186 to the servo motors 148 and 152. Referring again to FIGS. 11 and 15, the servo motors 148 and 152 are instructed to move the cutting tool 162 into engagement with the tube stock 104 at block 254. The cutting tool 162 is moved transversely towards the longitudinal axis 130 at a position upstream from the proximal end 107 thereby cutting the wall of the tube stock 104 to define a distal end 199 of the finished tube 10.

Figure 12:
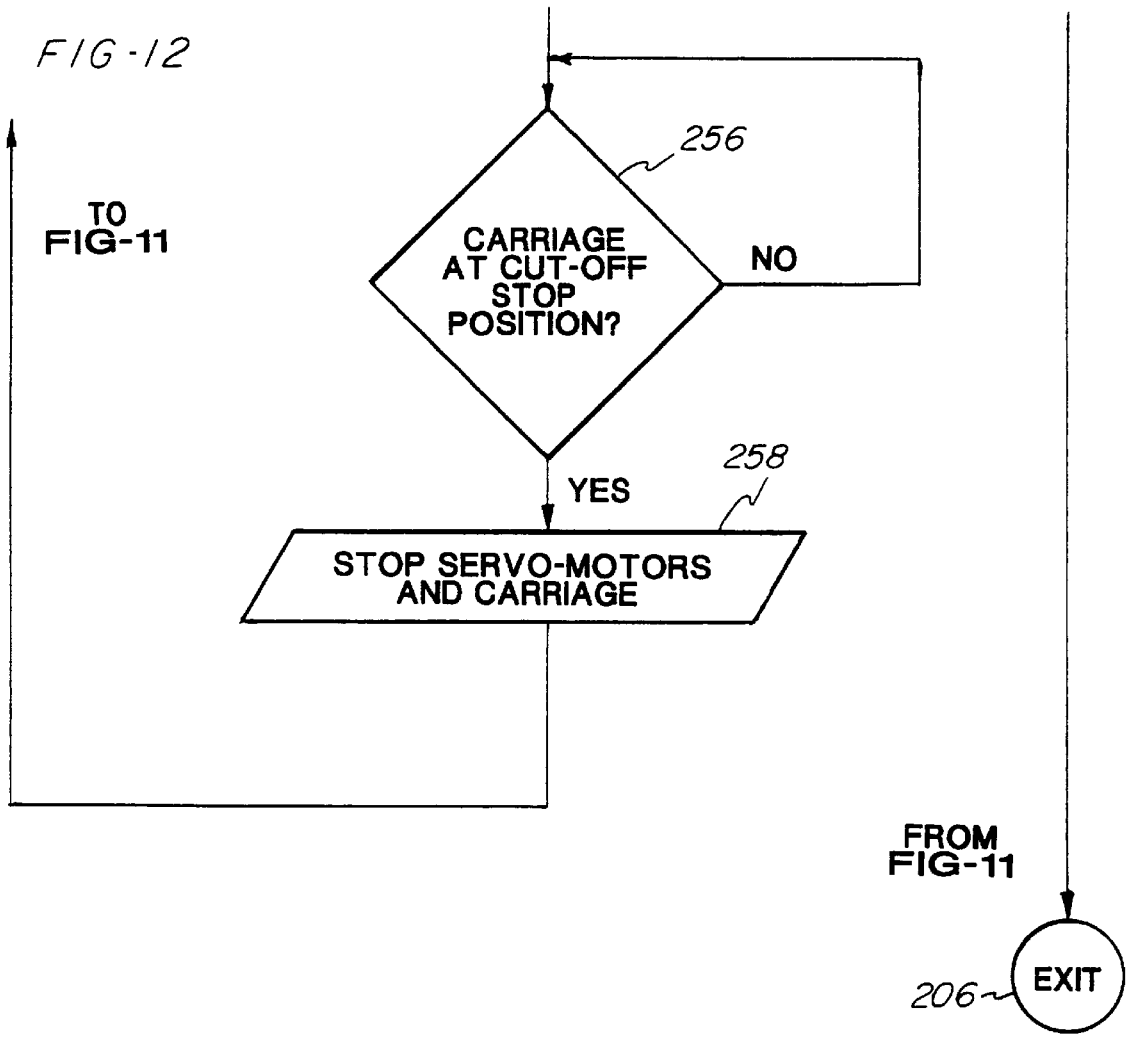

Turning now to block 256 of FIG. 12, once the servo motors 148 and 152 indicate that the carriage 132 is at a cut-off stop position, the controller 110 instructs the servo motors 148 and 152 to stop, as indicated at block 258. At this point, the system returns to the position immediately preceding block 210 where the controller 110 sends drive signals 184 and 186 to the servo motors 148 and 152 instructing them to move the carriage 132 to the forming start position. The cycle then repeats itself for the recently advanced tube stock 104.

From the foregoing description, it is apparent that the present invention provides a method and apparatus for forming sealed constricted ends on metallic tubes on an automatic continuous basis with minimal human intervention. Furthermore, the apparatus of the present invention is of an efficient and simple design resulting in reduced construction and maintenance cost.

While the method herein described, and the form of apparatus for carrying this method into effect, constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for forming an end of a metallic tube, said apparatus comprising:
   a frame;
   a carriage supported for movement on said frame;
   a headstock supported on said frame upstream from said carriage;
   a hollow spindle supported by said headstock for receiving a metallic tube, said spindle defining a longitudinal axis;
   a forming tool supported for movement with said carriage;
   a welding unit including a tip supported in spaced relation to said forming tool for movement with said carriage;
   a drive mechanism operably connected to said carriage for driving said carriage in movement relative said spindle; and
   a controller in communication with said drive mechanism for controlling movement of said carriage, said controller in further communication with said welding unit for controlling activation of said welding unit.

2. The apparatus of claim 1 further comprising a motor for driving said spindle in rotation, said motor in communication with said controller wherein said controller controls the operation of said motor.

3. The apparatus of claim 1 further comprising a sensor for detecting a tube within said spindle and providing a supply signal indicative thereof to said controller.

4. The apparatus of claim 1 further comprising a cutting tool supported in spaced relation to said forming tool for movement with said carriage.

5. The apparatus of claim 4 further comprising:
   a discharge conduit supported in spaced relation to said cutting tool for movement with said carriage; and
   a receiving bin for collecting a plurality of successive tubes discharged from said discharge conduit.

6. The apparatus of claim 1 further comprising a feeding device positioned upstream from said headstock for feeding the metallic tube toward said carriage along said longitudinal axis.

7. The apparatus of claim 1 wherein said drive mechanism includes a first linear actuator for driving said carriage in parallel relation to said longitudinal axis and a second linear actuator for driving said carriage in perpendicular relation to said longitudinal axis.

8. The apparatus of claim 7 further comprising first and second insulating blocks for electrically insulating said first and second linear actuators from said welding unit, wherein said first and second linear actuators comprise first and second electric servo motors.

9. The apparatus of claim 1 wherein said forming tool comprises an axle disposed substantially parallel to said longitudinal axis and a roller rotatably mounted on said axle.

10. The apparatus of claim 1 wherein said welding unit comprises a tungsten inert gas welder.

11. The apparatus of claim 1 wherein said welding unit supplies an energy having a duration approximately equal to $T=3300(K)(R)/15$, wherein T equals energy duration in seconds, K equals the wall thickness of the tube in inches, and R equals the radius of the tube in inches.

12. The apparatus of claim 1 wherein said drive mechanism is instructed by said controller to move said forming tool radially toward said longitudinal axis and axially downstream away from a proximal end of the tube and to move said laser tip into substantial alignment with said longitudinal axis proximate the proximal end of the tube.

13. A method for forming an end of a metallic tube, said method comprising the steps of:
   providing a metallic tube having an open proximal end and defining a longitudinal axis;
   rotating said metallic tube along said longitudinal axis;
   providing a carriage adjacent said proximal end, said carriage supporting a forming tool and a tip, said tip comprising part of a welding unit;
   providing a drive mechanism operably connected to said carriage;
   providing a controller in communication with said drive mechanism;
   causing said controller to supply a first drive signal to said drive mechanism;
   operating said drive mechanism in response to said first drive signal for moving said forming tool into engagement with said proximal end of said tube;
   causing said controller to generate a second drive signal; and
   operating said drive mechanism in response to said second drive signal for moving said tip into alignment with said longitudinal axis proximate said proximal end of said tube.

14. The method of claim 13 wherein said step of moving said forming tool into engagement with said proximal end comprises moving said tool radially inwardly toward said longitudinal axis and axially downstream away from said proximal end.

15. The method of claim 13 further comprising the steps of:
   causing said controller to generate a weld signal; and
   activating said welding unit in response to said weld signal thereby sealing said proximal end of said tube.

16. The method of claim 15 wherein said step of activating said tip comprises providing an energy for a duration approximately equal to T=3300(K)(R)/15, wherein T equals energy duration in seconds, K equals the wall thickness of the tube in inches, and R equals the radius of the tube in inches.

17. The method of claim 15 further comprising the step of sensing an arc generated by said tip and providing an arc signal indicative thereof to said controller.

18. The method of claim 15 further comprising the step of feeding said tube downstream through said spindle after said step of activating said welding unit.

19. The method of claim 18 further comprising the step of detecting a tube within said spindle and providing a supply signal indicative thereof to said controller.

20. The method of claim 18 further comprising the step of cutting said tube to form a distal end of said tube after said step of feeding said tube.

21. A method for forming an end of a metallic tube, said method comprising the steps of:
   providing a metallic tube having an open proximal end and defining a longitudinal axis;
   forming a substantially closed tip at said proximal end of said tube;
   substantially aligning a welding unit-with said longitudinal axis adjacent said closed tip of said tube; and
   activating said welding unit to provide an energy density to said tip equivalent to approximately 43,750 watts per square inch.

22. The method of claim 18 wherein said welding unit comprises a tungsten inert gas welder.

* * * * *